Aug. 29, 1944.   H. E. LOHMAN   2,356,770
COLTER
Filed Feb. 2, 1943

Inventor
Henry E. Lohman,
By McMorrow and Berman
Attorneys

Patented Aug. 29, 1944

2,356,770

UNITED STATES PATENT OFFICE 2,356,770

COLTER

Henry E. Lohman, Salina, Kans.

Application February 2, 1943, Serial No. 474,485

1 Claim. (Cl. 308—19)

This invention relates to colters for agricultural implements such as plows and the like, and has reference more particularly to a journal for the colter blade.

The primary object of the invention is the provision of a journal which will assure a freely rotatable colter blade at all times and will permit the blade to be easily and quickly applied and removed therefrom and will provide protection against the entrance of dirt and other foreign matter and the loss of lubrication, provision being made for convenient introduction of lubricant when needed.

With these and other objects in view as will become more apparent as the description proceeds, the invention consists in certain novel features of construction, combination and arrangement of parts as will be hereinafter more fully described and claimed.

Figure 1:
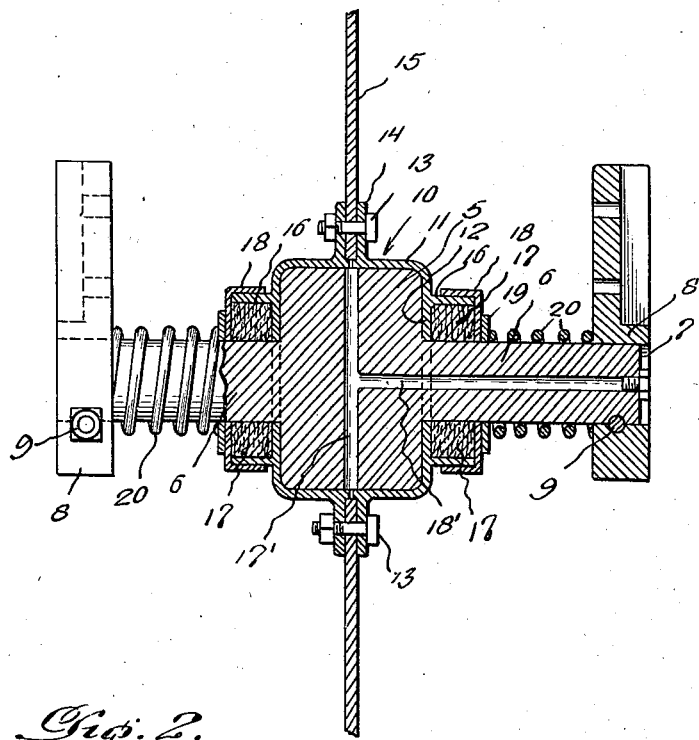

For a complete understanding of my invention, reference is to be had to the following description and accompanying drawing, in which Figure 1 is a vertical sectional view illustrating a journal for a colter blade constructed in accordance with my invention.

Figure 2:
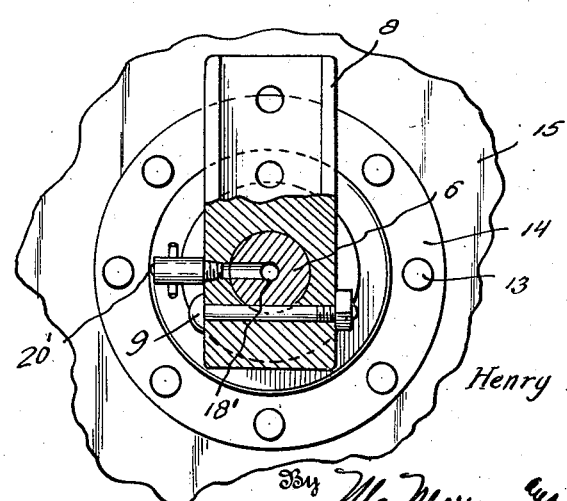

Figure 2 is a fragmentary end elevation, partly in section, showing the means for admitting lubricant to the journal.

Referring in detail to the drawing, the numeral 5 indicates a bearing member of substantially cylindrical shape having formed on opposite ends thereof pintles or shafts 6 received within openings 7 of hangers 8. The pintles or shafts are secured within the openings of the hangers by bolts 9 extending through the hangers and in grooves of the pintles or shafts. The attaching of the hangers 8 to a plow or similar agricultural implement can be carried out as usual.

A journal housing 10 receives the bearing member 5 and is adapted to rotate thereon. The journal housing includes an annular wall 11 and end walls 12 and is of sectional formation, the sections being detachably secured together by bolts or like fasteners 13 extending through flanges 14 formed on the annular wall 11 of the housing. The flanges 14 are of annular formation and receive therebetween a colter blade 15, the latter being apertured to receive the bolts 13.

Sleeves 16 are integral with the end walls 12 of the housing for the purpose of receiving packing 17 which contacts the shafts or pintles to prevent the loss of lubricant. The packing 17 is retained within the sleeves 16 by caps 18 of the flanged type fitting over the sleeves and mounted on the shafts 6. Washers 19 mounted on the shafts 6 engage the caps and provide seats for coil springs 20. The coil springs 20 surround the shafts and bear against the hangers. The action of the springs 20 is to retain the caps in seated position on the sleeves and against the packing, preventing the packing from moving out of the sleeves during the rotation of the colter blade.

A lubricant passage 17' is formed in the bearing member, the ends of which open outwardly through the annular wall of the bearing member. A branch lubricant passage 18' connects with the lubricant passage 17' and extends into one of the shafts 6 and has connected thereto a lubricant fitting 20' which will permit a lubricant gun to be easily applied to the device for the purpose of supplying lubricant into the journal so that the housing 10 may rotate on the bearing 5 with a minimum amount of friction.

The arrangement of the packing 17 prevents loss of the lubricant and also acts to exclude dirt and other foreign matter from the interior of the housing 10 during the use of the device.

While I have shown and described the preferred embodiment of my invention, it will be understood that minor changes in construction, combination and arrangement of parts may be made without departing from the spirit and scope of the invention as claimed.

Having thus described my invention, what I claim is:

In a journal for colters, a substantially cylindrical bearing member, shafts integral with said member and provided with grooves, hangers of an agricultural implement provided with openings to receive the shafts, bolts carried by the hangers and extending into the grooves, a journal housing rotatably supported by said member and including an annular wall and end walls contacting the bearing member and the shafts, said housing being of sectional formation and having annular flanges, fasteners detachably connecting the flanges and employed for securing thereto a colter blade, sleeves integral with the end walls of said housing and surrounding and spaced from the shafts to form a packing chamber, packing in said chamber in contact with the shafts, caps telescoping over the sleeves for closing said chamber and supported by the shafts and sleeves, springs supported by the shafts and acting to retain the caps on the sleeves, said bearing member and one of the shafts having connecting lubricant passages with one of the passages opening through walls of the bearing member, and a lubricant fitting mounted in one of the shafts and connecting with one of the passages.

HENRY E. LOHMAN.